Dec. 12, 1967  A. B. MUSICHUK  3,357,716
HANDLE CONSTRUCTION

Filed Jan. 18, 1965  2 Sheets-Sheet 1

INVENTOR.
ALEXANDER B. MUSICHUK
BY

Dec. 12, 1967     A. B. MUSICHUK     3,357,716
HANDLE CONSTRUCTION

Filed Jan. 18, 1965     2 Sheets-Sheet 2

INVENTOR.
ALEXANDER B. MUSICHUK
BY

United States Patent Office 3,357,716
Patented Dec. 12, 1967

3,357,716
HANDLE CONSTRUCTION
Alexander B. Musichuk, Parma, Ohio, assignor to The
M. T. & D. Company, a corporation of Ohio
Filed Jan. 18, 1965, Ser. No. 426,093
12 Claims. (Cl. 280—47.37)

ABSTRACT OF THE DISCLOSURE

A handle for a mower or the like comprising two elongated parts hingedly inter-connected to fold in one swinging direction but to extend substantially straight out from the mower when unfolded in an opposite swinging direction, and a rigidizing member pivotally connected to one of the hinged parts to selectively overlie a portion of the other hinged part to hold the hinged parts in a rigid extended position upon the rigidizing member being operatively coupled to said one hinged part and thus prevented from swinging relative to said one hinged part.

---

My invention relates to handle constructions for mowers or the like.

An object of my invention is to provide an improved handle construction which permits the handle to be folded out of the way when the mower is not in use and which permits the handle to be extended in a rigid manner when the mower is to be used.

Another object is the provision of an improved construction for obtaining a hinged relationship between parts of a handle construction and also permits the rigidizing of the parts so that the handle does not fold or hingedly collapse.

Another object is the provision of a hinged construction in a handle which facilitates both convenience and safety in the use of a mower and in the storage of a mower when not in use.

Other objects and a fuller understanding of the invention may be had by referring to the following description and claims, taken in conjunction with the accompanying drawings, in which:

Figures 5, 6:
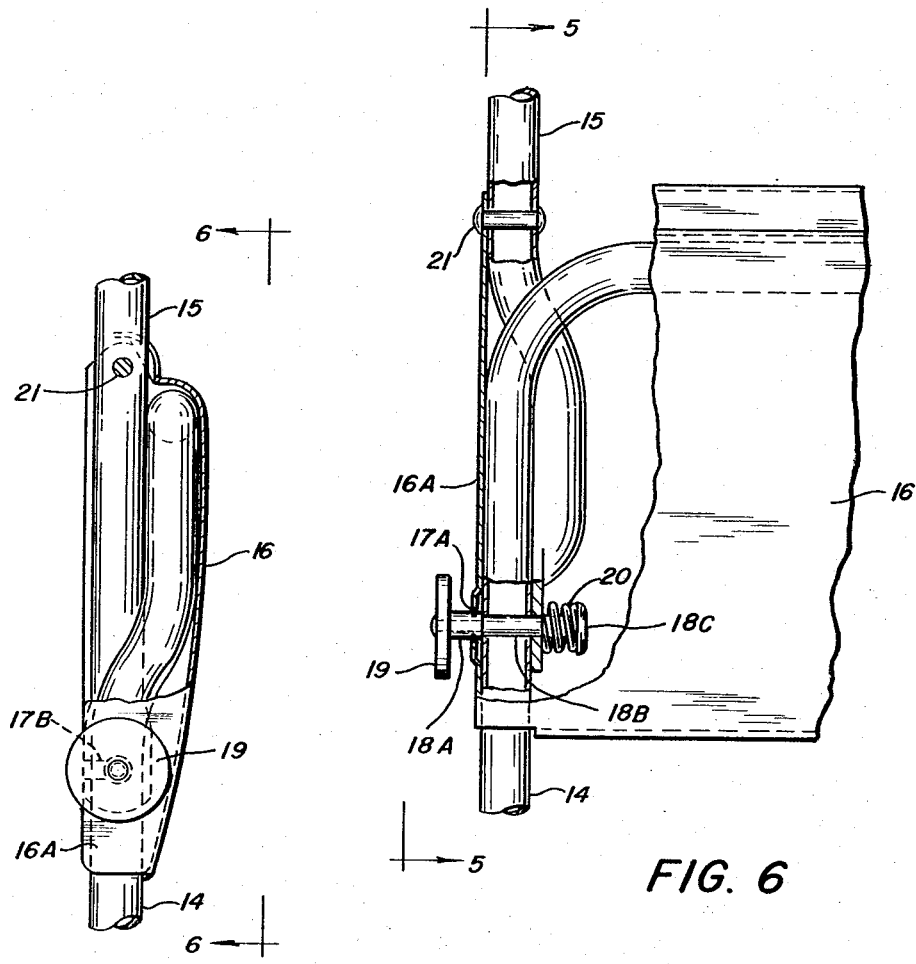
FIGURE 5 is an enlarged detail view of the hinged construction between the handle parts and looking in the direction of the arrows 5—5 of FIGURE 6.
Figure 7:
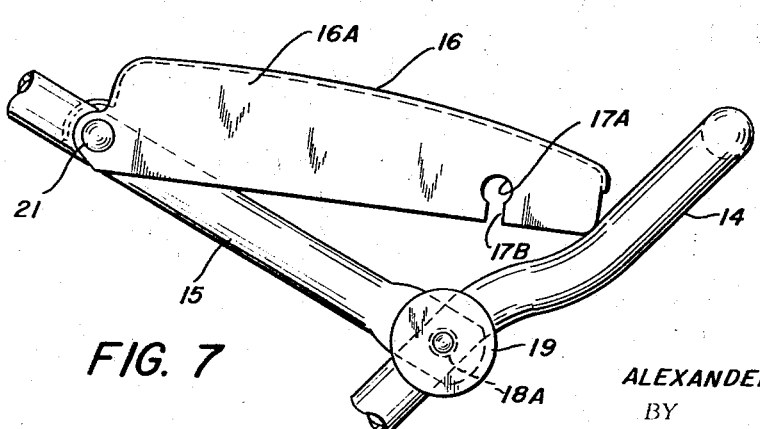

FIGURE 6 is another enlarged view of the hinged parts of the handle construction and looking in the direction of the arrows 6—6 of FIGURE 5; and FIGURE 7 is an enlarged view of the hinged parts of the handle construction showing the parts in a partially folded position, as compared with the relationship of the parts shown in FIGURES 5 and 6 when the handle parts are in aligned relationship and held rigid relative to each other.

My invention is shown applied to a rotary mower which is indicated generally by the reference character 11 in the drawings. The mower 11 has two spaced brackets 12 to which the handle is mounted. These brackets 12 are of the usual construction in that they have aligned openings in which axially aligned pins 13 of the side portions of a handle are inserted, the pins 13 in these holes permitting pivotal movement of the handle. On the sides facing each other, the spaced brackets 12 have a first projection or detent 12A against which the side bars of the handle engage when the handle is up in an operating position. At a lower location, toward the front of the mower, the brackets 12 have a second projection or detent 12B against which the side bars of the handle may engage when they have swung forwardly from their operating position, that is, extending upwardly and rearwardly. The brackets 12 have inclined surfaces facing each other between the projections 12A and 12B. As in the usual mounting of handle in mowers and the like, the handles may be readily mounted by moving the side bars toward each other in opposition to the resiliency of the bars to where the pins engage the aligned openings in the brackets 12. Upon releasing the tension of the side bars, the pins enter the openings, such as in the position shown in FIGURE 1. To swing the handle forwardly, the side bars are again squeezed toward each other to clear the projections 12A and then swung forwardly along the inclined surfaces to where the side bars engage the projections 12B.

My handle construction has a first or lower handle member 14 which has two spaced side bars joined at the upper ends thereof by upper cross-portion or bight 14A. Thus the first handle member is of general U-shape wherein the base of the U is uppermost and the free ends are pivotally connected to the brackets 12. The handle construction is preferably of steel or other suitable material which is strong and relatively rigid but with sufficient resiliency in the handle member 14 that the side bars may be resiliently flexed to provide the described engagement with the brackets 12.

The handle construction includes a second or upper handle member 15 which is also of general U-shape having two spaced side bars connected by an upper cross-portion or bight 15A. The upper cross-portion 15A may carry a hand-engaging portion whereby the operator of the mower or the like may readily seize the handle for manipulation of the mower. The free ends of the two side bars of the upper second handle member 15 are somewhat distorted from the alignment of the major portion of the side bars as better illustrated in FIGURE 6.

At or near the extreme free ends of the side bars of the second handle member 15 there are aligned openings which register with aligned openings in the side bars of the first handle member 14. Pivot pins extend through the aligned openings of the handle members 14 and 15 so as to provide a pivot connection between the handle members on each side thereof, that is, a side portion of one handle member is hingedly connected to a side portion of the other handle member and the other side portion of the respective handle members are similarly pivotally connected. In the absence of restraint which would otherwise rigidize the handle members relative to each other, the second handle member 15 may be swung in an arc on the aligned pivot pins relative to the first handle member 14.

A third or rigidizing member 16 is provided in my handle construction, which member 16 is preferably in the form of a metal panel which extends across and over the side bars of the second handle member 15 and which has parallel flange portions 16A extending downwardly at its opposite ends alongside of the side bars of the handle members 14 and 15 in alignment. As better seen in FIGURES 5, 6 and 7, the flange portion 16A at the opposite ends of the panel or rigidizing member 16 overlap and extend along the side of the side bars of the handle members, that is, on the outermost sides of said handle members.

The rigidizing or third member 16 is pivotally connected to the two side bars of the second handle 15 by aligned pivot pins 21 extending through the spaced flange 16A and through aligned openings in the side bars of the second handle member 15. The relationship is such that unless restrained or otherwise secured, the rigidizing or third member 16 may freely swing in an arc on the pivot pins 21 relative to the second handle member 15. The upper cross-portion 14A of the first handle member 14 is disposed under the third member 16 and in close proximity to the pivot pins 21 so that when the third member 16 is held or restrained to its position shown in FIGURES 1, 5 and 6, the cross-portion 14A is closely embraced between the side bars of the second handle member 15 and the third member 15 as illustrated in FIGURES 5 and 6. When thus held or restrained by the third member 16, the pivot connection between the handle members 14 and 15 is rigidized so that the handle member 15 may not swing relative to the handle member 14.

The pivot pins which pivotally connect the handle members 14 and 15 have a large shank portion 18A which is disposed outwardly toward the outer end and at which a knob or handle 19 is secured. The pivot pins also have a small shank portion 18B extending through the aligned openings in the side bars of the handle members 14 and 15 and which small shank portion 18B provides pivotal bearing support for the swinging of the second handle member 15 relative to the first handle member 14. The pivot pins also have flat enlarged inner end portions 18C directed toward each other. A coil spring 20 is mounted on each pivot pin to bear on the enlarged end portion 18C thereof and upon the side of the respective side bar of the second handle member 15. The bias of the spring 20 is such that the pivot pins are resiliently urged toward each other so that the parts have the relationship illustrated in FIGURES 1, 5 and 6.

The two spaced portions 16A of the third or rigidizing member 16 have aligned slots which are adapted to receive the pivot pins carrying the knobs 19. Each slot has a relatively large round bay portion 17A which as a diameter complementing the diameter of the large shank portion 18A. As seen in FIGURES 5 and 6, when the pivot pins are in their retracted position, that is, toward each other as urged by the springs 20, the enlarged shank portion 18A of each pivot pin is located within the large bay portion 17A of the slot. Each slot also has a narrow throat portion 17B, the width of the throat portion 17B being substantially less than the diameter of the large shank portion 18A of the respective pivot pins. Thus when the large shank portion 18A is within the large bay portion 17A, as seen in FIGURES 5 and 6, and the pivot pins are retracted towards each other by the springs 20, the third or rigidizing member 16 cannot be swung on the pivot pins 21 as the large shank portions 18A are locked within the large bay portions 17A of the respective slots. When it is desired to allow the third or rigidizing member 16 to be swung upwardly on its pivot pins 21 to the position shown, for example, in FIGURE 7, the knobs 19 are manually moved away from each other so as to overcome the bias of the springs 20 and to withdraw the enlarged shank portions 18A from the large bay portions 17A. This moves the small shank portions 18B outwardly into the slots, and the diameter of the portion 18B being less than the width of the throat 17B, the pivot pins may escape from the aligned slots in the flange portions 16A and the rigidizing member 16 swung up on the pivot pins 21.

Figure 1:
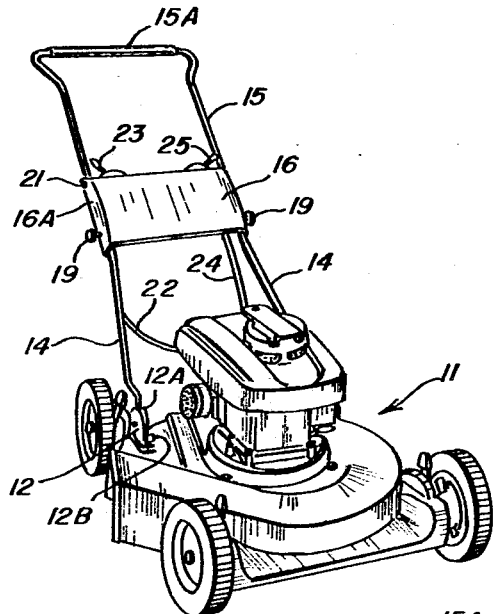
FIGURE 1 is a perspective view of a mower carrying a handle construction embodying a preferred form of my invention and illustrating the handle construction in rigid extended position.
Figure 2:
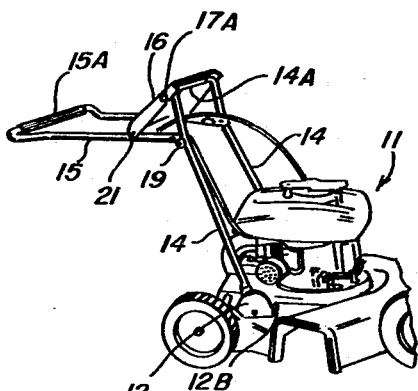
FIGURE 2 is a perspective view of the same mower showing the handle construction in a partial hingedly collapsed condition and illustrating an early stage through which the parts move when the handle is to be folded up for storage of the mower.
Figure 3:
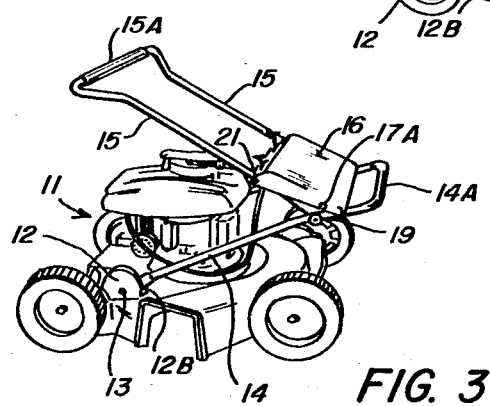
FIGURE 3 is another perspective view of the mower illustrating the handle construction folded to a greater degree and illustrating a later stage of the folding operation in placing the handle construction in collapsed condition.
Figure 4:
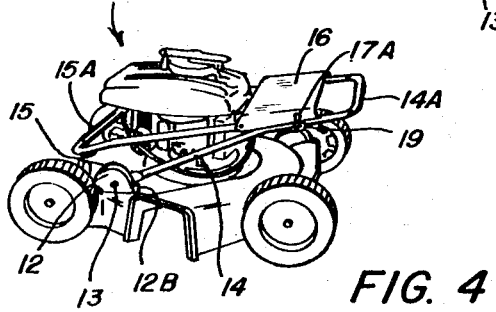
FIGURE 4 is another perspective view of the mower which shows the hinged parts in the complete folded condition and illustrates the position of the parts for storage of the mower.

It is thus seen that the pivot pins which pivotally connect the two handle members 14 and 15 also provide means for selectively locking the third or rigidizing member 16 down into the lock position illustrated in FIGURES 1, 5 and 6. When it is desired to fold the handle construction so as to permit the swinging of the handle members relative to each other free of such rigidizing restraint, the knobs 19 are manually moved outwardly, that is, away from each other so as to permit the member 16 to be swung upwardly and out of the interconnection with the pivot pins, such as to the position shown in FIGURE 7.

The sequence of operation is illustrated in FIGURES 1, 2, 3 and 4. In FIGURE 1, the parts are in their extended operating position whereby the mower may be manipulated and controlled by the operator. The first handle member 14 and second handle member 15 are held aligned and in relatively rigid position by the third or rigidizing member 16. When it is desired to store the mower or to get the handle construction in a lowered position so as to take up less room when the mower is not being used, the knobs 19 are manually moved away from each other and the second handle member 15 is swung downwardly to the position shown in FIGURE 2. The cross-portion 14A of the first handle member 14 thus escapes restraint as the third member 16 is allowed to swing upwardly on the pivot pins 21 and the handle member 15 is permitted to swing downwardly on its aligned pivot pins. Next the lower free ends of the side bars of the first handle member 14 are disengaged from the projections 12A by squeezing or pressing the side bars of the handle member 14 toward each other and then the handle member 14 is swung forwardly on the pivot pins 13 joining it to the brackets 12. The handle members then move toward the position illustrated in FIGURE 3. The cross-portion 15A of the handle 15 is then pressed downwardly to complete the swinging of the handle member 15 relative to the handle member 14 to where the parts are in the folded or stored position illustrated in FIGURE 4. The mower or the like is then free to be stored or placed in a position where the handle construction does not take up as much room. For getting the handle construction back in the position shown in FIGURE 1, the steps are reversed. When the parts approach the position shown in FIGURE 1 in this reverse sequence, the knobs 19 are moved outwardly against the bias of the spring 20 so as to permit the pivot pins to enter the slots and upon release of the knobs 19 the enlarged portions 18A will then be locked in the large bay portions 17A of the slots in the flange portions 16A of the third member 16.

To allow for the folding operation of the handle construction, a control lever 23, such as a throttle, is connected to the motor by a flexible cable 22 and a control lever 25, such as a choke, is connected to the motor by the flexible cable 24.

It has been found that this handle construction for a mower or the like provides a maximum of convenience and of safety in the use of such a device.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A handle construction for a mower or the like having a pair of laterally spaced mountings carried thereby, comprising a first handle member having spaced side portions adapted to be connected with said mountings, respectively, said first handle member having a bight portion connecting said side portions and maintaining the spacing therebetween, a second handle member having spaced side portions and a bight portion connecting said side portions and maintaining the spacing therebetween, first pivot connection means connecting side portions of the second handle member with the respective side portions of the first handle member at a distance from the bight portion of the first handle member to permit the second handle member to swing in an arcuate path about the axis of the first pivot connection means, said side portions of the first handle member being positioned outwardly of the side portions of the second handle member at the axis of said first pivot connection means to locate the bight portion of the first handle member in the path of the side portions of the second handle member swinging on said axis of the first pivot connection means to cause interference with the swinging of the second handle member on said axis of the first pivot connection relative to the first handle member beyond an angle determined by the location of said interference, a plate member extended between the side portions of the second handle member, second pivot connection means connecting said plate member with the side portions of the second handle member at a distance from the axis of the first pivot connection means to permit said plate member to swing on the axis of the second pivot connection means relative to said second handle member, and coupling means for coupling said plate member at a distance from the said second pivot connection means to the said second handle member to lock said plate member against swinging away from the second handle member on the axis of the second pivot connection means, said plate member upon being locked to said second handle member being disposed to overlie the bight portion of the first handle member positioned at said location of interference and to prevent swinging of the second handle member away from said location of interference.

2. A handle construction as claimed in claim 1 and in which said first pivot connection means and said coupling means together comprise pin members movable along their common axis and manually engageable and disengageable with said plate member and biased toward positions for engaging the plate member.

3. A handle construction for a mower or the like having a pair of laterally spaced mountings carried thereby, comprising a first handle member having lower end portions adapted to pivotally connect with said mountings, respectively, a second handle member, a first pivot connection between said handle members to permit said second handle member to swing relative to the plane of said first handle member, said handle members being disposed to interfere with each other at a location spaced from the axis of said first pivot connection upon swinging in one direction from a reference plane passing through the axis of the first pivot connection and to permit swinging at an angle to each other away from said plane, said first pivot connection being at a location intermediate the ends of the first handle member and adjacent an end of the second handle member, a rigid member, a second pivot connection between said second handle member and said rigid member, said second pivot connection being at a location intermediate the ends of said second handle member and adjacent an end of said rigid member, and a coupling member adapted for the ready coupling and uncoupling of said rigid member and said first handle member at a distance from said second pivot connection adjacent the location of said first pivot connection, said rigid member being freely swingable on said second pivot connection away from said first handle member in uncoupled condition and being formed and arranged to overlie the first handle member along an extent from the location of said first pivot connection to beyond the location of said interference to hold said handle members in engagement at said location of interference and the handle members in fixed disposition relative to each other upon said rigid member being coupled by said coupling member to said first handle member at the location of said first pivot connection, said second handle member being permitted to swing on said first pivot connection relative to the first handle member when said rigid member is uncoupled from the first handle member by the coupling member, said second handle member being held against swinging on said first pivot connection and at a fixed relationship to the first handle member when said rigid member is coupled to the first handle member by the coupling member.

4. A handle construction for a mower or the like having a pair of laterally spaced mountings carried thereby, a first U-shaped handle member having free end portions spaced from the bight portion thereof and adapted to be connected to said mountings, a second U-shaped handle member having free end portions spaced from the bight portion thereof and directed toward said first handle member, a pair of axially aligned pin members and pivotally interconnecting the free end portions of the second handle member and the said first handle member at a distance from the bight portion of the first handle member, the bight portion of the first handle member overlying the free end portions of the second handle member to permit swinging of the second handle member in only one direction away from the plane of said first handle member, said pin members having a shank and an operating knob, said shank having a first portion of relatively small diameter and a second portion of relatively large diameter, and a plate member having a panel portion extended laterally of said handle member in position to overlie the bight portion of the first handle member and having flange portions extending along opposite sides thereof, and axially aligned pivot connections between said flange portions and said second handle member adjacent the said free end portions thereof at a distance along the second handle member from said pin members to permit the plate member to swing relative to the plane of the second handle member toward and away from said pin members, the said flange portions having axially aligned openings extending from an edge thereof to accommodate said pin members, respectively, each said opening having a relatively narrow throat extending from the edge of the respective flange member and a relatively wide bay portion spaced from said edge, said throat being sufficiently wide to permit the first shank portion of a said pin member to be moved laterally therethrough but too narrow to permit said second shank portion to be moved laterally therethrough, said bay portion being sufficiently wide to accommodate said second shank portion therein, said pin members upon said second shank portions being located in said bay portions locking the said plate member to the pin members against swinging on said pivot connections away from the bight portion of the first handle member and to prevent the swinging of the second handle member in said one direction away from the plane of said first handle member, said pin members upon said first shank portions moving laterally out through said throats, respectively, releasing the plate member from the pin members for swinging on said pivot connections to allow angular movement of the second handle member relative to the first handle member, said pin members being movable axially along their respective lengths to selectively change the positions of said first and second shank portions.

5. A handle construction as claimed in claim 4 and including resilient means engaging the pin members biasing the pin members in an axial direction to maintain said second shank portions in alignment with the respective flange portions so as to be restrained against lateral movement through said throats.

6. A handle construction for a mower or the like having a pair of spaced mountings, a first U-shaped handle member having its lower free ends adapted to be connected to said mountings, a second U-shaped handle member having its free ends pivotally connected to said first handle member along the opposite side portions thereof intermediate the ends thereof, said handle members being connected and arranged so that the first handle member crosses over the second handle member at a location of interference along said first handle member and permits the second handle member to pivotally swing on one side only of said first handle member away from said location, a third member pivotally connected to the opposite side portions of the second handle member at a distance from the free ends thereof and extending beyond said location, and selectively operable locking means for locking said third member to said first handle member, at the location of the pivotal connection between said handle members, in fixed angular position relative to the plane of said second handle member, said third member being freely swingable on its pivot connection with the second handle member away from said first handle member in unlocked condition, said third member having a length along said handle members greater than the distance between the pivotal connection of the third member with the second handle member and the pivotal connection between said handle members and extending over the first handle member from said location of interference to said pivotal connection between said handle members, said third member having a portion adapted to engage said first handle member when in said fixed angular position to hold the second handle member at said location against the first handle member and from swinging relative to said first handle member on said one side of the first handle member to thereby rigidize the pivotal connection between said handle members, said locking means being disengageable to permit swinging of the third member on its pivotal connection with the second handle member and to permit the second handle member to pivotally swing on said one side of the first handle member.

7. A handle construction as claimed in claim 6 and including biasing means associated with said locking means for urging said locking means into locking position, said biasing means being carried by said locking means, abutting said second handle member, and being biased to urge the locking means into locking engagement with said third member.

8. A handle construction for a mower or the like comprising the combination of a first U-shaped handle member having opposite side portions adapted to be connected to the said mower or the like and a bight portion connecting the outer ends of the side portions, a second U-shaped handle member having opposite side portions and a bight portion connecting the opposite ends of the side portions, first pivot connection means connecting the side portions of the second handle member adjacent the free ends thereof to the side portions of the first handle member at a distance from the bight portion of the first handle member, the bight portion of the first handle member being disposed on one side of the side portions of the second handle member, the second handle member being swingable on said first pivot connection means relative to the first handle member, the bight portion of said first handle member on said one side of the side portions of the second handle member being positioned to permit swinging of the second handle member on one side of the first handle member and to block swinging of the second handle member beyond the limit permitted by said bight portion of the first handle member, a rigidizing member, second pivot connection means pivotally connecting the rigidizing member to the side portions of said second handle member at a distance from said first pivot connection means, said rigidizing member being swingable on said second pivot connection means relative to said second handle member on said one side of the second handle member, and coupling means for operatively coupling said rigidizing member to said second handle member at a distance from said second pivot connection means, said rigidizing member upon being coupled to said second handle member being adapted to overlie and engage said bight portion of the first handle member to prevent swinging on said first pivot connection means of the side portions of the second handle member away from the bight portion of the first handle member and thereby rigidize the swinging movement between the said handle members.

9. A handle construction as claimed in claim 8 and in which said coupling means includes a pin means on the axis of the first pivot connection means selectively movable along said axis in and out of engagement with said rigidizing member.

10. A handle construction for a mower or the like comprising in combination a first member having a first end adapted to be pivotally connected to said mower or the like and a second end extending therefrom, a second member having first end pivotally connected to said first member intermediate of its ends to swing in an arcuate path relative to the plane of said first member, said first member having an abutting portion adjacent the second end thereof and disposed in said arcuate path to abut the second member swinging in said arcuate path, said second member upon abutting said abutting portion of the first member being disposed in substantial alignment with the first member and extending outwardly therefrom, a third member having a first end pivotally connected to said second member at a location intermediate of its ends to swing in a second arcuate path relative to the plane of said second member, said third member at a distance from said location having an engaging portion adapted to engage the abutting portion of said first member upon the third member being held against swinging in said second arcuate path away from the plane of said second member, said third member having a securing portion adapted to be selectively secured in fixed position relative to the place of said first member and to be unsecured therefrom, said engaging portion being positioned along said third member intermediate of said first end of the third member and said securing portion, said engaging portion upon engaging said abutting portion being held against swinging in said second arcuate path by the coupling of said securing portion to said second member being thereby disposed to limit the swinging of the second member in said first arcuate path away from the plane of the first member and thereby maintaining the second member in said substantial alignment with the first member, said third member upon being unsecured from said fixed position being free of the said second end of the first member to swing away from the plane of said first member and to clear said abutting portion for permitting the second member to pivotally swing away from the second end of the first member and to fold back on the first member.

11. A handle construction as claimed in claim 10 and including a selectively operable coupling means to couple the said securing portion of the third member to the second member for holding the third member against swinging in said second arcuate path away from the plane of the said second member and alternately to uncouple the said securing portion from said second member for permitting the third member to swing away from the plane of the said second member to move the engaging portion of the third member away from the abutting portion of the first member.

12. In a folding handle construction for a mower or the like, the combination of a first member mounted to the mower or the like adjacent a first end of the first member, a second member pivotally connected adjacent a first end thereof to the first member at a location intermediate the first and second ends of the first member, a third member pivotally connected adjacent a first end thereof to the second member at a location intermediate the first and second ends of the second member, said third member at a location adjacent said first end thereof being disposed on one side of the first member adjacent the second end thereof and said second member at a location adjacent the first end thereof being disposed on an opposite side of the first member whereby the said first member adjacent the second end thereof may be clamped between the second member and third member to prevent pivotal swinging of the first and second members relative to each other on said pivotal connection therebetween, and selectively manually operable securing means adjacent the location of the pivotal connection between the first and second means for securing a second end of said third member against pivotal swinging away from the second member on its pivotal connection with the second member and away from the second end of the first member for maintaining said second end of the first member clamped between the third member and first member, whereby the pivotal connection between the first and second members may be selectively rigidized.

References Cited
UNITED STATES PATENTS

| | | | |
|---|---|---|---|
| 1,695,438 | 12/1928 | Panalle et al. | 16—11 |
| 2,670,932 | 3/1954 | Westerfors | 287—99 |
| 2,727,753 | 12/1955 | Johnson et al. | 280—47.37 |
| 3,204,272 | 9/1965 | Green et al. | 16—110 |

BOBBY R. GAY, *Primary Examiner.*

MARVIN A. CHAMPION, *Examiner.*

D. L. TROUTMAN, *Assistant Examiner.*